(12) United States Patent
Bresland

(10) Patent No.: US 6,273,052 B1
(45) Date of Patent: Aug. 14, 2001

(54) COUPLING ARRANGEMENT FOR RECIPROCATING PISTON ENGINE

(76) Inventor: Claude Neil Bresland, Lot 6, Kyneton Road, Metcalfe, Victoria 3448 (AU)

( * ) Notice: Subject to any disclaimer, the term of this patent is extended or adjusted under 35 U.S.C. 154(b) by 0 days.

(21) Appl. No.: 09/486,524
(22) PCT Filed: Jul. 28, 1998
(86) PCT No.: PCT/AU98/00466
  § 371 Date: May 9, 2000
  § 102(e) Date: May 9, 2000
(87) PCT Pub. No.: WO99/11906
  PCT Pub. Date: Mar. 11, 1999

(30) Foreign Application Priority Data

Sep. 1, 1997 (AU) .................................................. PO 8852

(51) Int. Cl.[7] .................................................. F02B 75/32
(52) U.S. Cl. ...................................... 123/197.4; 123/78 B
(58) Field of Search ............................. 123/197.3, 197.4, 123/48 B, 78 B, 78 BA

(56) References Cited

U.S. PATENT DOCUMENTS

| | | | |
|---|---|---|---|
| 1,379,115 | * | 5/1921 | Mallory ................................ 123/78 B |
| 1,420,236 | * | 6/1922 | Bohman ............................... 123/197.4 |
| 5,245,962 | | 9/1993 | Routery ............................... 123/197.3 |

FOREIGN PATENT DOCUMENTS

| 0219634 | 4/1987 | (EP) . |
|---|---|---|
| WO 88/04356 | 6/1988 | (WO) . |

* cited by examiner

Primary Examiner—Noah P. Kamen
(74) Attorney, Agent, or Firm—Samuels, Gauthier & Stevens

(57) ABSTRACT

A coupling arrangement for interconnecting a piston gudgeon pin and a crankshaft journal of a reciprocating piston engine, the arrangement comprising:

a connecting rod having a first end pivotally connected to the crankshaft journal, a connection member pivotally connectable at a first pivot point to a second end of the connecting rod and pivotally connectable to the piston gudgeon pin at a second pivot point distal from the first pivot point, and rotation transfer means acting to transform a rotational movement of the first pivot point about the piston gudgeon pin into a rotatioial movement of the crankshaft journal about the crankshaft.

10 Claims, 5 Drawing Sheets

COUPLING ARRANGEMENT FOR RECIPROCATING PISTON ENGINE

BACKGROUND OF THE INVENTION

The invention relates to reciprocating piston engines, and in particular to coupling arrangements for interconnecting a gudgeon pin and a crankshaft journal of such an engine. The invention is applicable to reciprocating piston combustion engines and compression engines and it will be convenient to hereinafter describe the invention in relation to that exemplary application, although it should be appreciated that the invention is not limited to the application.

Conventional reciprocating piston engines are generally manufactured in two and four stroke designs. A single piston is housed within each cylinder, the piston being connected from a central piston gudgeon pin to a single bearing crankshaft journal by a single solid center mounted connecting rod. After combustion has taken place in the combustion chamber of the piston, the energy derived from the expansion of the combustible material forces the piston to travel along the length of the cylinder away from the combustion chamber. This translational movement is transferred via the connecting rod to the crankshaft journal and is transformed into a rotational movement as the crankshaft is driven around its longitudinal axis. As the crankshaft completes each revolution, the connecting rod interconnecting the crankshaft journal and the gudgeon pin forces the piston back along the length of the cylinder towards the combustion chamber, where combustion once again takes place and the cycle is repeated.

Conventional engines of this type are arranged so that the maximum combustive pressure within the cylinder is generated when the piston is at top dead center and the crankshaft journal is at a corresponding top center position, that is to say, at a position closest to the cylinder combustion chamber. The resultant effect of this arrangement is that immediately following ignition at or slightly after the top center position of the crankshaft, the downward travel of the piston in the cylinder rapidly causes the enlargement of the volume of the cylinder above the upper surface of the piston. A rapid drop in combustion pressure is thus created and there is a corresponding rapid reduction in the force applied to the piston, and hence to the crankshaft journal for rotation of the crankshaft.

The applicant has observed that such an arrangement inefficiently converts energy from the combustion of gases in the combustion chamber to a motive force for turning the crankshaft. There exists a need to create a more efficient reciprocating piston engine where more power can be derived from the same amount of combustible material or, alternatively, a lesser amount of combustible material may be used to achieve the same amount of power.

SUMMARY OF THE INVENTION

It is an object of the present invention to provide a reciprocating piston engine which overcomes or ameliorates one or more of the disadvantages of known reciprocating piston engines.

With this in mind, the present invention provides a coupling arrangement for interconnecting a gudgeon pin and a crankshaft journal of a reciprocating piston engine, the arrangement comprising:

a connecting rod having a first end pivotally connected to the crankshaft journal, a connection member pivotally connectable at a first pivot point to a second end of the connecting rod, and pivotally connectable to the gudgeon pin at a second pivot point distal from the first pivot point, and rotation transfer means acting to transform a rotational movement of the first pivot point about the gudgeon pin into a rotational movement of the crankshaft journal about the crankshaft.

In an engine having these features, the point of attachment of the connecting rod is separated from the gudgeon pin by a connection member pivotally attached between the connecting rod and the gudgeon pin. With such an arrangement, it is possible to create a reciprocating piston engine in which the crankshaft journal need no longer be at a top center position when the piston is at its top dead center position. The crankshaft journal is able to be located at a position intermediate the top center position and a bottom center position so that, at shortly after combustion—when the combustion chamber is at its maximum pressure and the corresponding maximum force is applied to the piston—a greater torque is able to be applied to the crankshaft journal than is possible with conventional reciprocating piston engines. By maintaining or reducing the cylinder volume in the combustion chamber after the crankshaft journal turns past its top center position, the maximum available force in the engine is able to be applied to the crankshaft journal at an optimum position during its rotational cycle.

This and other advantages and features of the invention will be better appreciated from the following description which refers in more detail to the various features of the coupling arrangement of the present invention. To facilitate an understanding of the invention, reference is made in description to the accompanying drawings where the coupling arrangement is illustrated in preferred embodiments. It is to be understood, however, that the coupling arrangement of the present invention is not limited to the embodiments illustrated in the drawings.

DETAILED DESCRIPTION OF THE INVENTION

Figure 1:
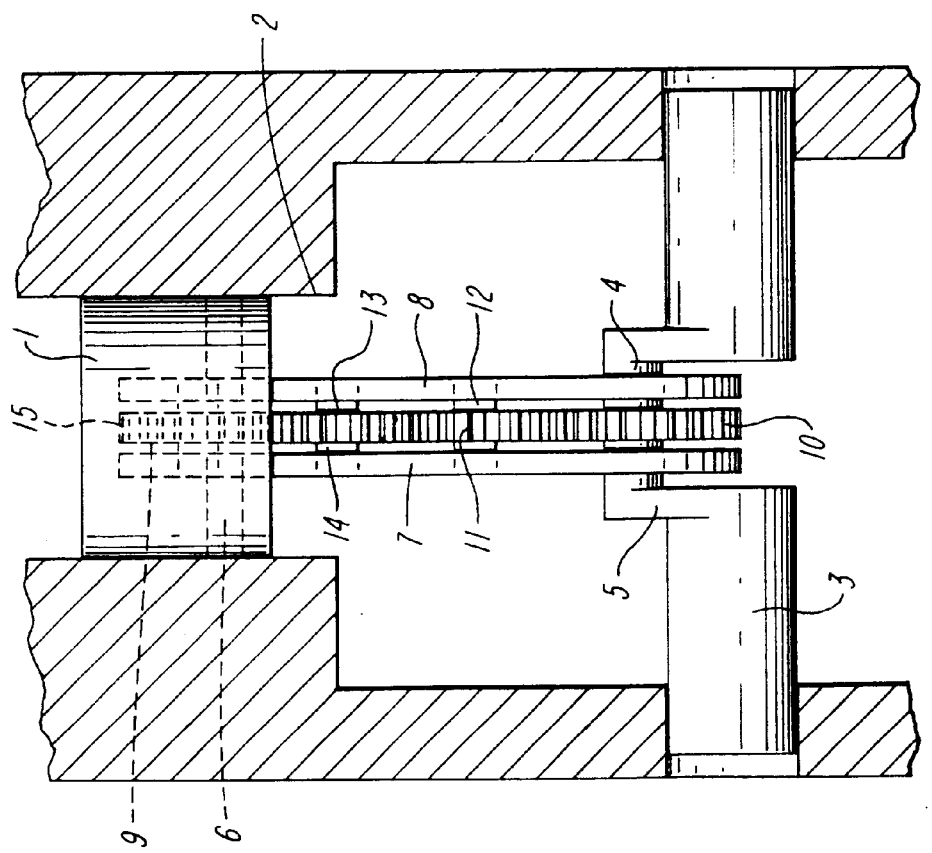
FIG. 1 is a schematic front view of a reciprocating piston engine including a first embodiment of a coupling arrangement according to the present invention.

Referring now to FIG. 1, there is shown generally a single piston within a reciprocating piston engine. The piston I is located within a cylinder 2. The engine also includes a crankshaft 3 and a crankshaft journal 4 maintained at a position radially displaced from the longitudinal axis of the crankshaft 3 by crankshaft rods 5. In the position shown in FIG. 1, the crankshaft journal is at a top center position. The piston 1 incorporates a piston gudgeon pin 6.

A coupling arrangement is provided for interconnecting the piston gudgeon pin 6 and the crankshaft journal 4 of the engine. This coupling arrangement comprises a connecting rod including two connecting rod halves 7 and 8 each of which has a first end pivotally connectable to the crankshaft journal 4 via a split bearing arrangement.

Figure 2:
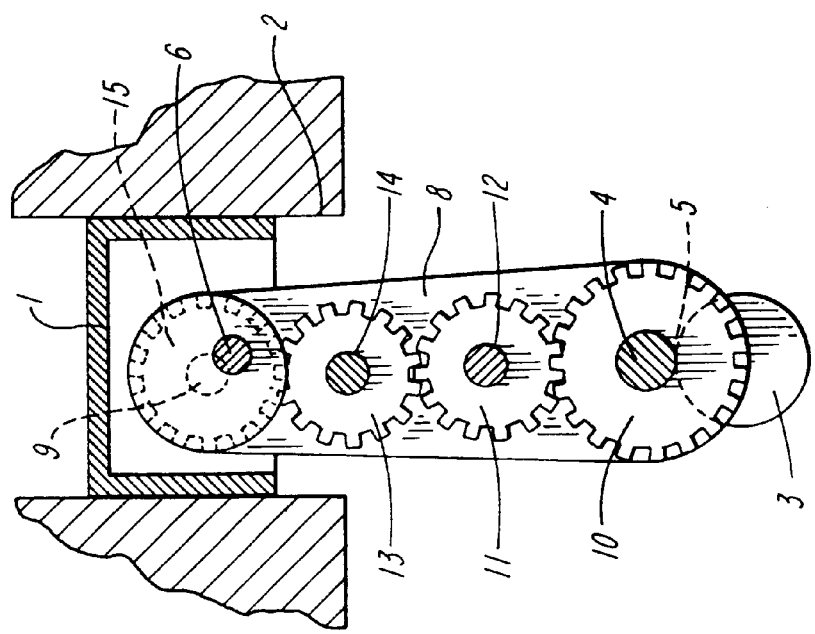
FIG. 2 is a side view of the reciprocating piston engine of FIG. 1.

A connection member 9. in this case a cam disc, is pivotally connectable at a first pivot point (the center of the cam disc 9, as can be best seen in FIG. 2) to a second end of the connecting rod 7, 8. The cam disc 9 is also pivotally connectable to the gudgeon pin 6 at a second pivot point distal from the first pivot point, that is to say, that the point at which the cam disc 9 is attached to the piston gudgeon pin 6 is off center from the center of the cam disc 9.

The coupling arrangement also includes rotation transfer mechanism acting to transform a rotational movement of the first pivot point about the gudgeon pin 6 into a rotational movement of the crankshaft journal 4 about the crankshaft 3. In the example illustrated in FIGS. 1 and 2, the rotation transfer mechanism includes a gear train or like mechanism interconnecting the first pivot point (the center of the cam disc 9) and the crankshaft journal. The gear train includes a crankshaft gear 10 centrally located and fixedly held about the crankshaft journal 4 so that it is unable to independently rotate around the longitudinal axis of the crankshaft journal 4. The rotation transfer mechanism also includes a secondary gear 11 mounted to at least one of the connecting rod halves 7, 8 by a secondary gear retaining pin 12 and about which the secondary gear is able to rotate. Similarly, an idler gear 13 is mounted to at least one of the connecting rods 7, 8 via an idler gear retaining pin 14. A cam disc gear 15 is fixedly attached to the cam disc 9. When mounted in position, the crankshaft gear 10 is positioned so as to interact and mesh with the secondary gear 11, which in turn interacts and meshes with the idler gear 13. The idler gear 13 interacts with and meshes with the cam disc gear 15. According to such an arrangement, as the piston 1 is driven up and down the bore of the cylinder 2, the cam disc 9 will be caused to rotate around the piston gudgeon pin 6. As the center of the cam disc 9 rotates around the gudgeon pin 6. the gear train 15, 13, 11 and 10 ensures that the rotational movement of the cam disc center is transferred to the crankshaft journal with the result that the crankshaft journal is driven in a rotational movement about the crankshaft 3. Moreover, these two rotational movements are synchronized so that the angular displacement of the first pivot point, or center of the cam disc 9, and of the crankshaft journal is the same, each starting and completing a 360° revolution at the same time as the other.

The cam disc 9 and the cam disc gear 15 are held in position by the connecting rod halves 7, 8 to allow the piston gudgeon pin 6 to pass from one side of the piston 1 through the cam disc 9 and cam disc gear 15 to the other side of the piston 1, securely connecting the piston 1 to the crankshaft journal 4 by means of the above described coupling arrangement. As the cam disc gear 15 and the cam disc 9 rotate, the piston gudgeon pin 6 is forced to rotate also. As the gudgeon pin 20 rotates it can be seen from FIG. 2 that the distance between the crankshaft journal 4 and the piston 1 will be cyclically lengthened and then shortened. as the center of the cam disc 9 rotates around the off center mounting position of the cam disc 9 on the gudgeon pin 6.

Figure 4:
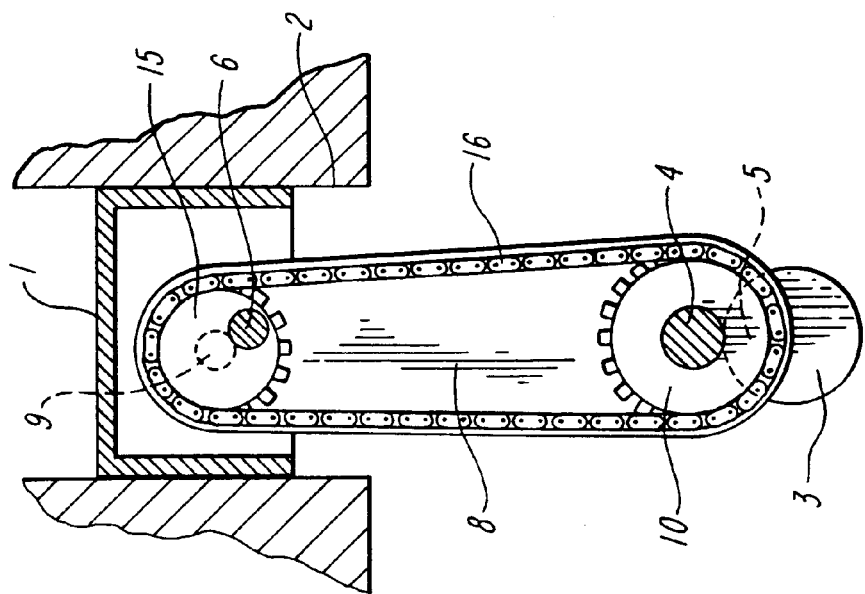
FIG. 4 is a side view of the reciprocating piston engine of FIG. 3.
Figure 3:
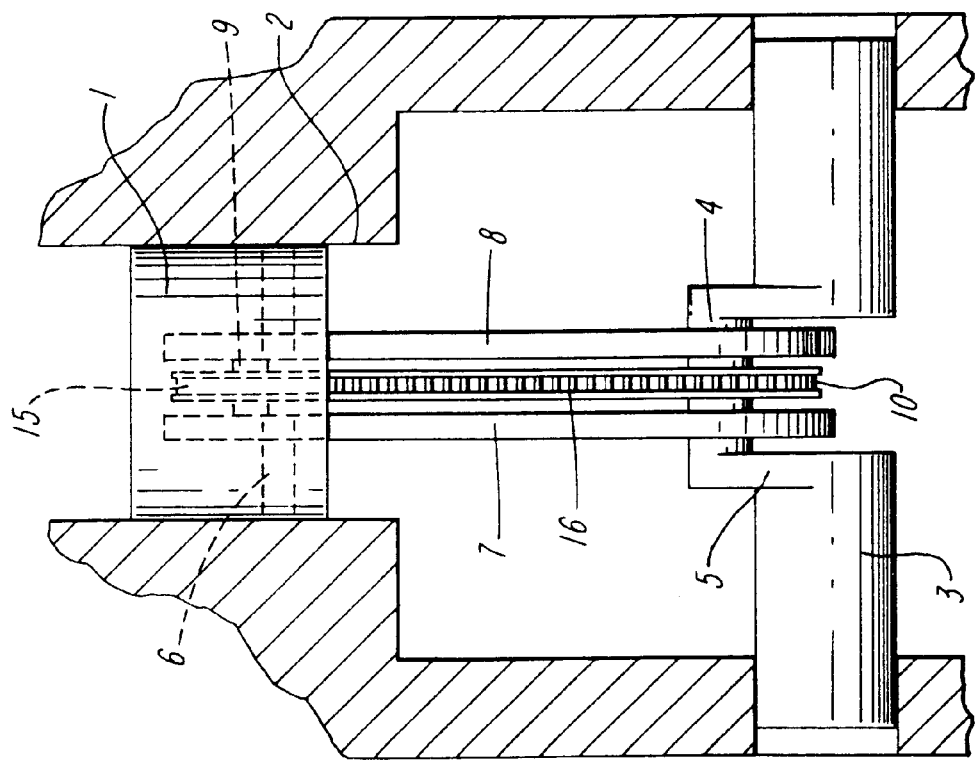
FIG. 3 is a front view of a reciprocating piston engine including a second embodiment of a coupling arrangement according to the present invention.

FIGS. 3 and 4 show an alternative embodiment of the coupling arrangement, in which the rotation transfer mechanism further includes a chain or like mechanism interconnecting two or more gears in the gear train. In this embodiment, the crankshaft journal gear 10, and the cam disc 9 and associated cam disc gear 15, have been retained and are connected respectively to the piston gudgeon pin 6 and the crankshaft journal 4 in the manner previously described. However, in this embodiment, the cam disc gear 15 and the crankshaft journal disc 10 are interconnected by a chain 16. According to this arrangement, the direction of rotation of the cam disc gear 15 and of the crankshaft journal disc 10 will be the same, where as these two gears were caused to rotate in opposite directions in the arrangement shown in FIGS. 1 and 2.

It is to be appreciated that whereas the arrangements in FIGS. 1 to 4 show the interconnection of various gears and chains, a variety of like mechanisms may be used in the context of the present invention. For example, coupling arrangements using pulleys and belts and other devices for the transfer of rotational movement may easily be envisaged by a skilled worker in this field.

Figure 5:
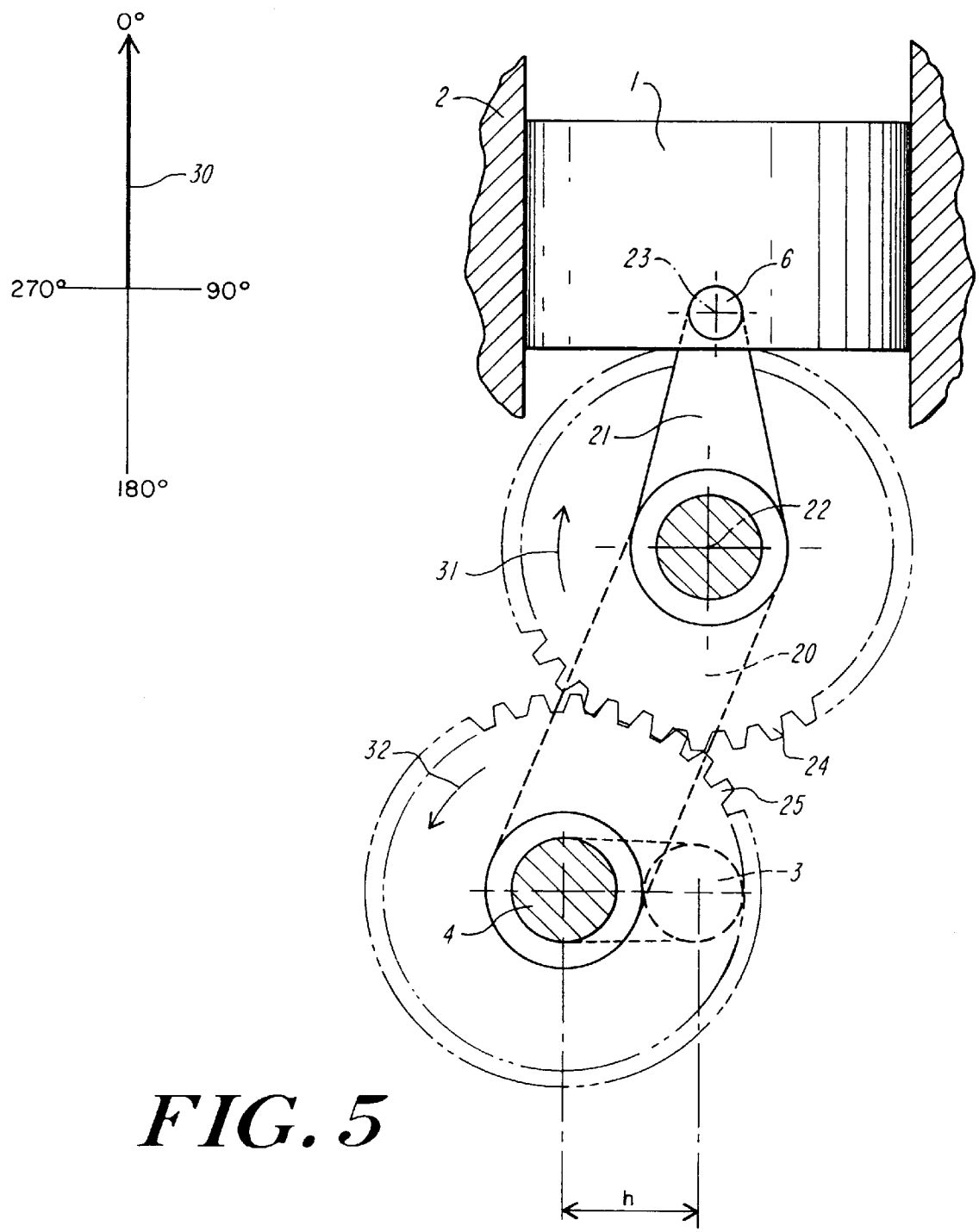
FIG. 5 is a side view of a third embodiment of a coupling arrangement according to the present invention.
Figure 6:
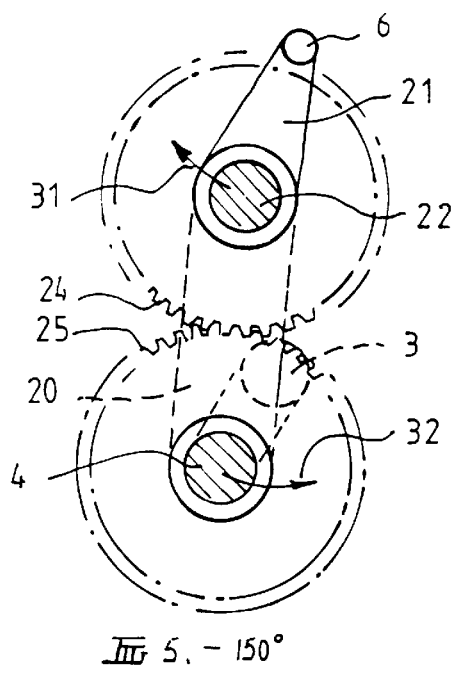
FIGS. 6 to 12 are side views of the coupling arrangement of FIG. 5 in various angular positions during operation.
Figure 7:
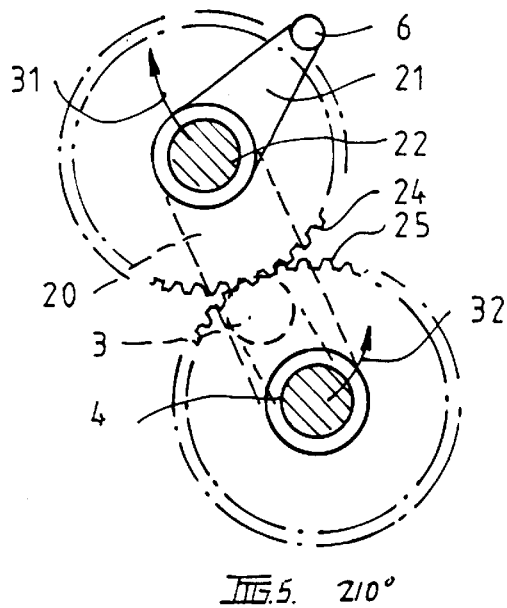
Figure 8:
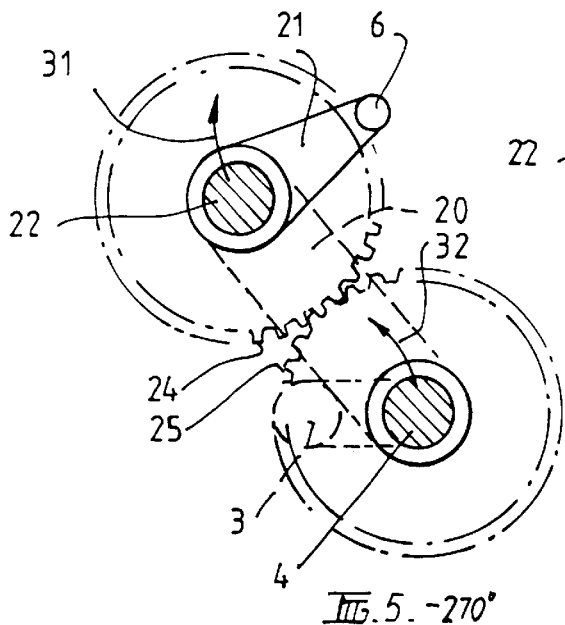
Figure 9:
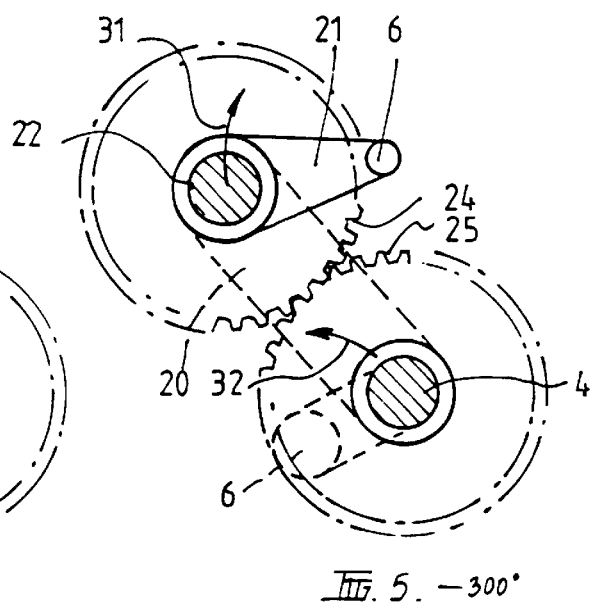
Figure 10:
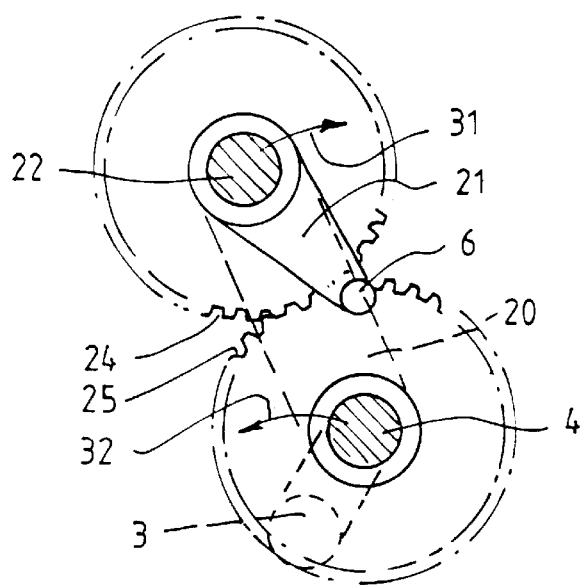
Figure 11:
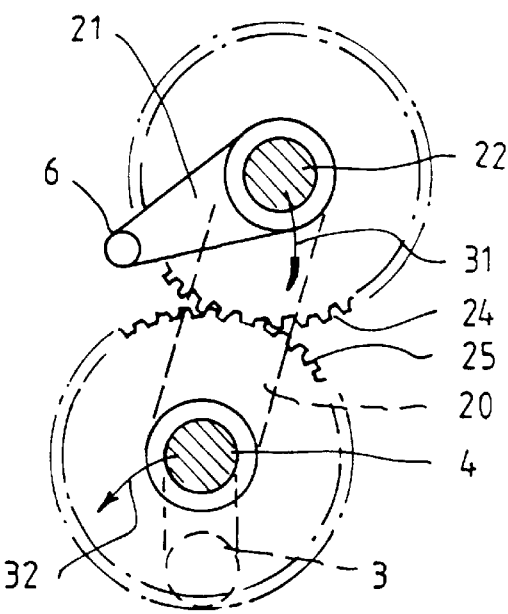
Figure 12:
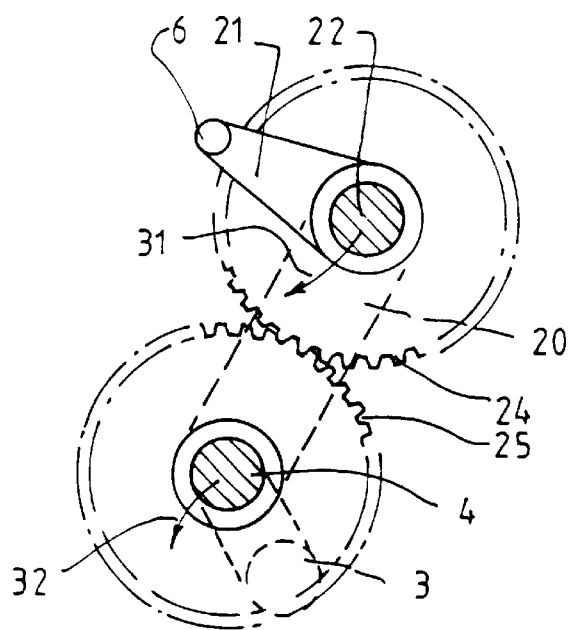

Either of the two embodiments shown in FIGS. 1 and 2, and FIGS. 3 and 4, enable the setting of the angular position of the first pivot point (or center of the cam disc 9) with respect to the gudgeon pin 6, as well as the angular position of the crankshaft journal 4 with respect to the crankshaft, so that, unlike conventional reciprocating piston engines, the top dead center position of the piston 1 need not necessarily require that the crankshaft journal 4 be located in its top center or uppermost position. An example of this will now be described with reference to FIG. 5, which shows schematically the crankshaft journal 4, crankshaft 3 and gudgeon pin 6. A connecting rod 20 is pivotally connected at a first end to the crankshaft journal 4. A connection member 21 is pivotally connected at a first pivot point 22 to a second end of a connecting rod 20. The connection member 21 is also pivotally connected to the gudgeon pin 6 at a second pivot point 23 distal from the first pivot point 22. It will be noted that in this case, the connection member 21 is not in the form of a disc, and that the rotation transfer mechanism is formed by two intermeshing gears only, referenced 24 and 25, which are respectively fixed or otherwise mounted to the connection member 21 around the first pivot point 22 and fixed around the crankshaft journal 4. From this diagram, it can be seen that whilst the angular position of the first pivot point 22 with respect to the gudgeon pin is approximately 180° with respect to a reference axis 30, the angular position of the crankshaft journal 4 with respect to the crankshaft 3 is approximately 270° with respect to that same reference axis. As ignition occurs, the piston 1 is forced down in the cylinder 2, and force is transmitted from the gudgeon pin through the connecting member 21 and the connecting rod 20 to the crankshaft journal 4. As the crankshaft journal 4 is no longer at its top center or uppermost position when piston 1 is at top dead center, but, as shown, is located laterally from the crankshaft 3 at a horizontal distance "h". The force applied to the crankshaft journal 4 at the instant just after ignition results in a substantially increased torque being applied to the crankshaft journal 4. Consequently, the engine is able to develop more power than conventional reciprocating engines. As the crankshaft journal 4 is driven anti-clockwise (as shown in FIG. 5) around the longitudinal axis of the crankshaft 3, the gear 25 is caused to rotate in the direction shown by the arrow referenced 32. This causes a corresponding rotation of the gear 24 in the direction shown by the arrow 31. This rotation causes the first pivot point 22 of the connection member 21 to be driven in a clockwise direction around the gudgeon pin 6.

The various exemplary embodiments of the rotation transfer mechanism shown in the drawings act to maintain the angular position of the first pivot point with respect to the gudgeon pin, and the angular position of the crankshaft journal with respect to the crankshaft, at a fixed separation during operation of the engine. By way of example, in FIG. 5 the angular position of the first pivot point 22 with respect to the gudgeon pin 6 is approximately 180° with respect to the reference axis 30. The angular position of the crankshaft journal 4 with respect to the crankshaft is approximately 270° with respect to that same reference axis. The separation between these two angular positions is therefore approximately 90°. As the gears 24 and 25 mesh with each other during operation of the engine, both the crankshaft journal 4 and the first pivot point 22 rotate synchronously, respectively about the longitudinal axis of the crankshaft 3 and the piston gudgeon pin 6, so that rotation starts and stops at the same time and that after each revolution the angular position of the first pivot point and of the crankshaft journal will be as shown in FIG. 5.

FIGS. 6 to 12 show the relative angular positions of the coupling arrangement of FIG. 5 through a complete revolution of the first pivot point 22 about the piston gudgeon pin 6. FIGS. 6 to 9 show the coupling arrangement at 60 degree intervals, whilst the angular spacing between representations of FIGS. 9 to 12 is 30 degrees.

Returning once again to FIG. 2, it can be seen that the rotation transfer mechanism according to this embodiment enables the relative angular positions of the first pivot point and the crankshaft journal during operation of the engine to be adjusted. In this embodiment, to set the relative angular positions just mentioned, one of the connecting rod halves 7 or 8 may be removed and one or both of the secondary gear 11 or idler gear 13 removed so that, temporarily, rotational movement is not transferred from the cam disc 9 to the crankshaft journal disc 10. The angular position of the center of the cam disc 9 with respect to the gudgeon pin 6 may then be set by rotating the cam disc gear 15 to the desired position. Similarly, the crankshaft journal 4 may be rotated around the longitudinal axis of the crankshaft 3 to achieve a desired angular position. Next, the piston 1 may be displaced up or down the cylinder 2 so that the secondary or idler gear removed may be reinserted and the connecting rod halves 7, 8 reattached to both the crankshaft journal and the cam disc. In this way, both the angular position of the first pivot point with respect to the gudgeon pin, and the angular position of the crankshaft journal with respect to the crankshaft, may be independently set at any desired value.

It has been found experimentally that the present invention provides not only the advantage of developing more torque within the engine at the moment of combustion or maximum compression, but also provides several other advantages depending upon the relative angular positions of the first pivot point and the crankshaft journal during operation of the engine. For example, it is possible to vary the length of the piston travel within the cylinder by changing the relative angular positions of the first pivot point and the crankshaft journal.

It is also possible to vary the speed of travel of the piston within the cylinder at various stages of the cycle of operation of the engine. For example, it is possible to choose relative angular positions of the first pivot point and the crankshaft journal so that the speed of travel of the piston in the proximity of its bottom dead center position is reduced. In this configuration, the piston spends a large proportion of its time in the bottom of the cylinder, thus allowing an increased amount of time for the exhaust of waste combustion gases (when the coupling arrangement of the present invention is used in a reciprocating piston combustion engine).

The rotation transfer mechanism may also enable the adjustment of the relative lengths of the distance from the second to the first pivot points of the connection member and the distance from the crankshaft journal to the crankshaft. For example, the cam disc of FIGS. 1 to 4 may be provided with one or more locations at which the disc may be attached to the gudgeon pin 6. Each of these locations may be at varying distances from the center of the cam disc 9. Some of these locations may be at a greater distance from the center of the cam disc 9 than the distance from the crankshaft journal to the crankshaft, whilst others may be at a smaller distance. If a relatively large distance is selected between the center of the cam disc 9 and the gudgeon pin 6, a given angular displacement of the cam disc 9 will result in a relatively large travel of the piston within the cylinder. Conversely, the selection of a relatively small distance between the center of the cam disc 9 and the gudgeon pin 6 will mean that for a relatively small distance travelled by the piston in the cylinder 2, a significant angular displacement of the cam disc 9 will take place, resulting in a corresponding significant rotation of the crankshaft journal around the crankshaft. It will be appreciated that a variety of configurations of this nature may be desired depending upon the characteristics of the engine and its performance that may be sought.

Those skilled in the art will appreciate that there may be variations and modifications of the connection arrangement described herein which are within the scope of the present invention.

What is claimed is:

1. A coupling arrangement for interconnecting a piston gudgeon pin and a crankshaft journal of a reciprocating piston engine, the arrangement comprising:

a connecting rod having a first end pivotally connectable to the crankshaft journal, a connection member pivotally connectable at a first pivot point to a second end of the connecting rod, and pivotally connectable to the piston gudgeon pin at a second pivot point distal from the first pivot point, and rotation transfer means acting to transform a rotational movement of the first pivot point about the piston gudgeon pin into a rotational movement of the crankshaft journal about the crankshaft.

2. A coupling arrangement according to claim 1, wherein the rotation transfer means are adjustable to set the relative angular positions of the first pivot point and the crankshaft journal.

3. A coupling arrangement according to claim 1, wherein the rotation transfer means are adjustable to set the relative lengths of the distance from the second pivot point and the first pivot point and the distance from the crankshaft journal to the crankshaft.

4. A coupling arrangement according to claim 1, wherein the rotation transfer means includes a gear train interconnecting the first pivot point and the crankshaft journal.

5. A coupling arrangement according to claim 4, wherein the rotation transfer means further includes a chain interconnecting two or more gears in the gear train.

6. A coupling arrangement according to claim 7, wherein at least a portion of the gear train is mounted to or maintained in position by the connecting rod.

7. A coupling arrangement according to claim 1, wherein the gear train includes a first gear fixedly attached to the crankshaft journal.

8. A coupling arrangement according to claim 7, wherein the gear train includes a second gear fixedly attached to the connecting member.

9. A combustion engine including a piston gudgeon pin and a crankshaft journal interconnected by a coupling arrangement according to claim 1.

10. A compression engine including a coupling arrangement according to claim 1.

* * * * *